ated Jan. 6, 1959

2,867,538

PROTECTIVE BACKING COMPOSITIONS FOR MIRRORS

Arthur Bienenfeld, Chicago, Ill.

No Drawing. Application June 27, 1955
Serial No. 518,357

1 Claim. (Cl. 106—14)

My invention relates to the coating of glass, plastic or other hard surfaced transparent materials to produce mirrors. As is well known, the basic coating for the transparent material is made by chemically depositing pure silver upon a cleansed and sensitized surface of such material. The coating is then covered with backing of paint, shellac or very thin copper in order to protect the silver coating from moisture and other corrosive influences existing in the atmosphere. Also, the method of protecting the silver coating by the application of molten beeswax has been published, the direction being to spread the molten wax evenly over the surface of the silver, the mirror then being allowed to cool.

The advantage of a wax backing is not only its function as a covering, but it has the additional property of barring and repelling moisture. The latter is known as a carrier of substances which are corrosive or destructive to the silver coating of mirrors, and it follows that a backing which has the properties of a firm coating as well as a moisture repellent is a proper protector for the silver coating of the mirror. However, the application and durability of a wax backing depend on certain important factors, and one object of the present invention is to put the wax in a form for thorough and efficient application.

A further object is to place the wax in suspension within a liquid which is suitable for use as a spray for the application of the backing composition to the silver mirror coating.

An additional object is to include the wax in an emulsion employing water as the basic vehicle, in order to produce a spray which is widely dispersed and economical.

Another object is to mix the backing with a substance designed to facilitate the formation of the emulsion of the wax in the water to a highly homogeneous extent.

A still further object is to include an ingredient in the backing composition which is a stabilizer and preservative to maintain the content of the composition in uniform condition.

In accordance with the above objects, a specific formula for the backing composition under consideration is comprised of the following ingredients and approximate amounts:

| | Percent |
|---|---|
| Paraffin | 48 |
| Triethanolamine | 5 |
| Phenol | 1 |
| Water | 46 |

The composition is prepared by adding the three last named ingredients to the wax and agitating the resulting liquid until it forms an emulsion. Experiments in preparing the above emulsion have produced a particle size as fine as .00012 therein.

In respect to properties and functions of the composition ingredients, it is known that the hard waxes form good insulators by reason of their density and water repellent nature. Also, they are constituted to withstand a temperature much higher than that found in the atmosphere or ordinarily encountered. It therefore may be assumed that a backing composition of hard wax, in preference to beeswax—which has a low melting point—will remain durable under ordinary heat conditions.

The triethanolamine has the property of an emulsifier, creating a uniform bond between the suspended wax and the water vehicle, resulting in a wide dispersion of the wax therein. The phenol is provided as a stabilizer or preservative of the other ingredients in order to maintain the proper suspension of the wax in the emulsion and protect the wax against deteriorating influences.

In the use of the backing composition, it is preferable to apply it by means of a compressed air type of spray gun, such as is used in most industrial paint spray systems, and to mount the gun on a carriage which has a reciprocating motion in respect to the mirror, the latter being moved on a conveyor. Thus, the application of the spray will be regular and uniform. The water content of the backing compound evaporates when the latter is allowed to stand, leaving the treated wax as a hard, moisture-repelling backing for the silver mirror coating. Fortified as stated, the backing may be depended upon to form a durable and protective insulator or cover for the silver coating over a long period of time.

While I have described the invention along specific lines, various minor changes or refinements may be made therein without departing from its principle, and I reserve the right to employ all such changes and refinements as may come within the scope and spirit of the appended claim.

I claim:

A sprayable composition for the protective backing for the silver coating of a mirror consisting essentially of 48% of paraffin, 5% of triethanolamine to provide an emulsifier resulting in wide dispersion of the wax, 1% of phenol to provide a stabilizer and preservative to maintain proper suspension of the wax and to protect it against deteriorating influences and 46% of water, said composition having been agitated into an emulsion, said emulsion sprayable with a compressed air type of spray gun on the silver coating of a mirror for regular and uniform application, said water adapted to evaporate to leave the applied backing hard, durable and moisture-repellent, to protect the silver coating from moisture and other corrosive effects in the amosphere.

References Cited in the file of this patent

UNITED STATES PATENTS

| 1,196,508 | Bernitz | Aug. 29, 1916 |
| 2,144,642 | Stoughton et al. | Jan. 24, 1939 |

FOREIGN PATENTS

| 354,782 | Great Britain | Aug. 6, 1931 |

OTHER REFERENCES

Bennett: Commercial Waxes, Chemical Pub. Co. (1944), pages 53, 33 and 334.

John: Modern Polishes and Specialties, Chemical Pub. Co., 1947, page 113.